(12) United States Patent
Jorba Gonzalez

(10) Patent No.: US 6,753,762 B1
(45) Date of Patent: Jun. 22, 2004

(54) SIGNALLING BEACON

(75) Inventor: Jose Jorba Gonzalez, Terrassa (ES)

(73) Assignee: Innovacio Viaria SL (ES)

( * ) Notice: Subject to any disclaimer, the term of this patent is extended or adjusted under 35 U.S.C. 154(b) by 0 days.

(21) Appl. No.: 09/830,940

(22) PCT Filed: Sep. 2, 1999

(86) PCT No.: PCT/ES99/00282
§ 371 (c)(1),
(2), (4) Date: Aug. 24, 2001

(87) PCT Pub. No.: WO01/18761
PCT Pub. Date: Mar. 15, 2001

(51) Int. Cl.⁷ .................................................. G08B 1/00
(52) U.S. Cl. ..................... 340/333; 340/908.1; 340/331
(58) Field of Search ................................ 340/333, 908, 340/908.1, 331, 321

(56) References Cited

U.S. PATENT DOCUMENTS

| 3,427,500 A | * | 2/1969 | Harney, Jr. et al. ...... 315/200 A |
| 4,132,983 A | * | 1/1979 | Shapiro ....................... 340/331 |
| 4,355,309 A | | 10/1982 | Hughey et al. |
| 4,590,471 A | | 5/1986 | Pieroway et al. |
| 4,841,278 A | | 6/1989 | Tezuka et al. |
| 4,857,885 A | * | 8/1989 | Umerez ....................... 340/321 |
| 5,469,157 A | * | 11/1995 | Carpenter et al. ........ 340/908.1 |
| 5,585,783 A | * | 12/1996 | Hall ............................ 340/473 |
| 6,512,451 B1 | * | 1/2003 | Eslambolchi et al. .... 340/425.5 |
| 6,556,147 B1 | * | 4/2003 | Fisher et al. ................ 340/908 |

FOREIGN PATENT DOCUMENTS

| ES | 2101617 | 7/1997 |
| FR | 2674316 | 9/1992 |
| WO | 9205612 | 4/1992 |
| WO | 9313984 | 7/1993 |

* cited by examiner

Primary Examiner—John Tweel
(74) Attorney, Agent, or Firm—Ostrolenk, Faber, Gerb & Soffen, LLP

(57) ABSTRACT

A signalling beacon comprised of a lighting indicator which is mounted in a body enabling the stacking thereof. An energy accumulation device, at least one photovoltaic cell and an electronic device of the beacon are in the beacon. The electronic device has a radio frequency receiver circuit to receive radio communication signals which are emitted by an emitter circuit, and a light indicator control circuit. The light indicator control circuit includes a timer, a logic circuit intended to the polarization of the timer and of the light indicator, and a connection device for the switching off of the energy accumulation device when the beacons are piled up. A signalling beacon is obtained with a high autonomy, which is also remotely controllable and it has a high versatility of applications.

12 Claims, 3 Drawing Sheets

SIGNALLING BEACON

This invention refers to a radio frequency controlled signalling beacon, which has a luminous spot light, likewise a photo-voltaic cell to feed the internal circuitry.

BACKGROUND OF THE INVENTION

The known signalling beacons are fitted with a luminous spotlight, which are used to mark out areas being used for public works, mainly for road works, such as temporary diversions.

Generally, said beacons are supplied with power from an electric generator and connected to each other by means of electrical cables. This system has the significant disadvantage of needing an external source of energy to feed the set of said beacons. The electric generators mentioned usually have considerable size and this causes problems at the time of moving them. On the other hand, any breakage, be it voluntary or involuntary, in any one of the electrical cables means the absence of electricity to one or all of the beacons in the set.

Another system that is known is to incorporate batteries in each one of the signalling beacons. This avoids the problem of breakage of the electrical cables, but brings with it a significant expense, as it is necessary to replace said batteries with certain regularity. In addition, each one of the beacons has to be switched on and off individually and carried out manually, which means a significant waste of time and lack of control in the switching on and off.

In the international patent WO-9313984-A of William Lane, a lighting system is described for airport runways in order to help the landing of aircraft. Said lighting system is made up of a luminous spotlight, a battery, solar cells and an aerial that detects the reception of a signal and switches on the luminous light. In addition, the device is fitted with a light sensitive switch in order to ensure that the spotlight is not on during the day.

In the international patent WO-9205612-A of Italsolar S.p.A., a lighting system for airports is also described. Said system is made up of one or more photo-voltaic modules, a battery, a charging regulator, a current supply and control module, one or more luminous spotlights, and a control and remote control unit. The current supply and control module is fitted with a microprocessor that controls the internal electrical functions and a transmitter.

In the Spanish patent 9400035 of Jose Jorba Gonzalez, a signalling cone is described which is made up of a luminous spotlight fitted into a hollow housing, in which a battery is fitted in addition to a switching device. The cone is also made up of solar cells and a device to pick up electromagnetic radiation. The switching mechanism switches on the spotlight when the pick up mechanism receives electromagnetic radiation emitted by a transmitter situated at a distance.

All of the mentioned patents have a series of significant disadvantages that will be described below.

Primarily, it is important to highlight that none of the above mentioned systems can be stacked, be it because of their construction or because of other functional reasons. This disadvantage means that their transport is made more difficult, likewise their installation.

In the second place, none of the mentioned systems allow their own switching off, which means, all have a nominal consumption, which brings about the discharge of the battery, although very small, even when they are not in use and thus reducing their autonomy. On the other hand, owing to the configuration of the solar cells, the energy balance of the above mentioned systems is very poor in regard to the energy characteristics required by same.

Finally, said systems are not very versatile, which means, they are for specific applications and do not allow for differing uses, such as in fences or dividers on the roads.

DESCRIPTION OF THE INVENTION

With the signalling beacon of the invention the solution to said disadvantages is achieved, providing other advantages which will be described.

The signalling beacon is characterised in that by the fact that the control circuit of the luminous indicator is made up of a timer, a logical circuit aimed at the polarisation of the timer and luminous indicator, in addition to a connection mechanism for the switching off of the energy accumulation device in the case of stacking up of said beacons.

In this way a signalling beacon is achieved that can be stacked and which allows for automatic switching off without having any nominal consumption, and which is very versatile.

Preferably, the photovoltaic cell is made up of 16 equal cell elements joined in series, forming a total surface area of at least 100 $cm^2$, preferably 120 $cm^2$.

With said configuration a supply system is achieved with a positive energy balance, which gives the beacon a more than sufficient autonomy for its correct working.

In accordance with the characteristics of the invention, the transmitter-radio frequency encoder circuit is made up of an aerial, a transmitter, an encoder, numerous micro switches and a 'pull-up' of resistors.

The transmitter-encoder circuit generates a 9-bit raster, which is transmitted by radio frequency and that contains the data necessary in order for the circuit to control the management of the beacon.

Preferably, the receiver-decoder circuit is made up of an aerial; a receiver, a decoder, numerous switches and 'pull-up' resistors.

With this configuration the 9-bit raster transmitted by radio frequency is achieved by the transmitter-encoder circuit and it is decoded so that it can be interpreted by the control circuit.

Advantageously, the luminous indicator is made up of at least a highly luminous light emitting diode.

In accordance with the application that is required for the beacon, the number of light emitting diodes present must be changed and likewise their positioning.

In addition, the signalling beacon is made up of a support, on the inside of which the energy accumulation device is fitted.

The configuration of this support can be very different, and this gives it the aforementioned versatility. Thus, it is possible to use the beacon in different situations such as on the ground, on fences or in the central strips of roads separating lanes with opposed sense.

In accordance with the making up of the invention, the signalling beacon includes a radar device on the inside of the support.

The radar allows the speed of vehicles to be controlled, in the event of the beacon being used on a road.

Also advantageously, the energy accumulation device is a lead battery.

It is also important to point out that the frequency range of the signals transmitted by the transmitter-encoder circuit is from 25 to 1,000 MHz and has a potential of less than 10 mW.

In this way it is possible to use low potential equipment, with some restrictions on the type of reduced use, which means, at these frequencies it is possible to use the beacon without applying for a licence.

The signalling beacon has a rod. At one end the rod is in contact with the connection mechanism, while the other end remains free.

When the beacons are stacked up the rod is activated by the cover of the beacon immediately underneath and indirectly activates the switch, which carries out a cut off of the supply to the circuitry of the beacon.

BRIEF DESCRIPTION OF THE DRAWINGS

In order to give a greater understanding in so far as that which has been set out, some drawings are included in which, are schematic and only by way of an example which are not limiting, a practical case of its carrying out is represented.

In said drawings.

DESCRIPTION OF A PREFERRED EMBODIMENT OF THE INVENTION

Figure 1:
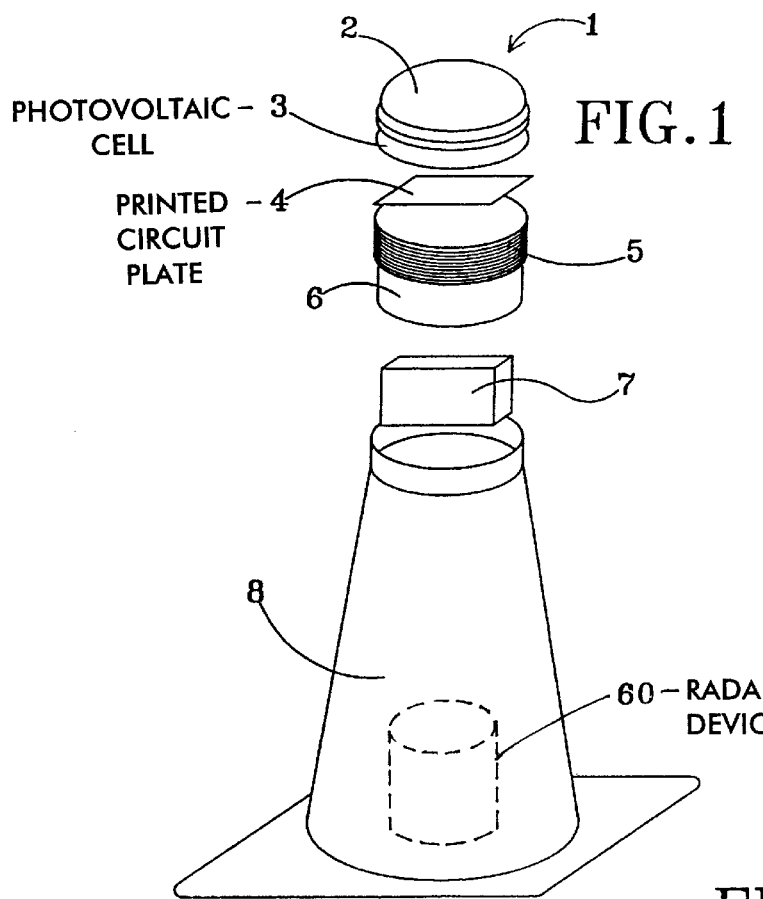
FIG. 1 is an exploded view of a signalling beacon, which is the object of the invention.

As can be seen in FIG. 1, the signalling beacon -1- which is the object of the invention is made up of a cover -2- for the protection of the interior of the beacon, a photovoltaic cell -3-, a printed circuit plate -4- where all the circuitry associated with the beacon -1- is to be found (see FIG. 3), a diaphragm -5-, a casing -6-, a battery -7- for the electronic supply to the beacon -1- and a support -8- for the beacon -1-.

In the said figure, the support -8- of the beacon -1- is a cone, the upper part of which has been cut off. With this embodiment it is possible to use the beacon -1- for the signalling of any even that might arise, for example, on a road. There are other possible supports that would allow the beacon -1- to be used, for example on separating fences, typically those used in towns; on protection fences, used on roads; or in the central strip of roads separating opposing lanes.

Thus, owing to the great versatility of the beacon -1- of the invention, it is possible to use said beacon -1- in whatever location required for the signalling of any type of incident.

Figure 2:
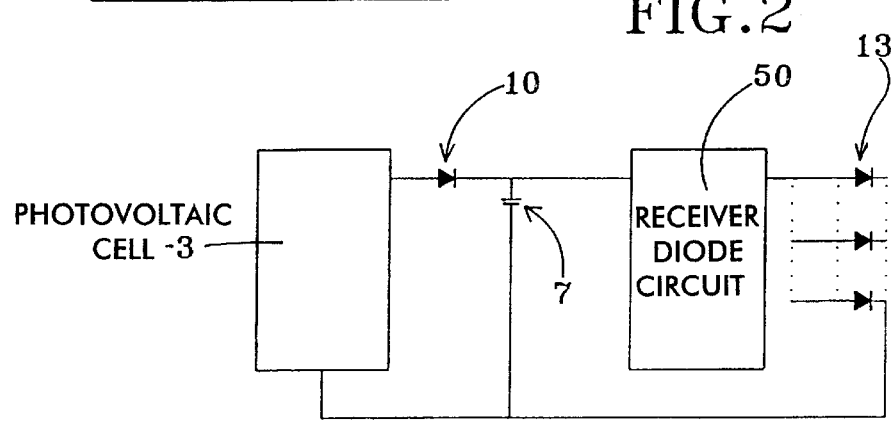
FIG. 2 is a block circuit diagram of the signalling beacon in FIG. 1.

In FIG. 2 the block circuit diagram of the beacon -1- can be seen. As can be appreciated, the circuitry is made up of a photo voltaic cell -3-, a protection diode -10-, the battery -7- that stores the energy generated by the photo voltaic cell -3-, an electronic control and receiver-decoder circuit -50-, and numerous luminous indicators -13-.

The photo-voltaic cell -3- has an approximate area of 120 cm$^2$, divided into 16 equal parts connected in series in order to achieve an open circuit tension of 9.2 V and short circuit current of 200 mA, in standard lighting conditions. With this configuration in experiments it has been possible to obtain irradiance values close to 800 W/m$^2$, to come to exit values of the cell of up to 9 volts and current of up to approximately 200 mA, in good conditions of irradiance. All of these data give rise to a positive energy balance and more than enough for its use.

The protection diode -10- is a Schottky diode that exhibits a $V_f$ of 0.32 V.

The battery -7- is a lead battery of 6 V and 5 Ah. It is also possible to use a battery of 6 V and 4 Ah, but in this case the autonomy of the beacon -1- is reduced.

The luminous indicators -13- are made up of a set of 6 high intensity light emitting diodes (LED). The light emitting diode colour can vary, but the colours red (635 nm), orange (618 nm), amber (588 nm), greenish-yellow (570 nm) and green (560 nm) stand out. These light emitting diodes give a luminosity of between 10 and 25 cd when working at current level of 20 mA.

Figure 3:
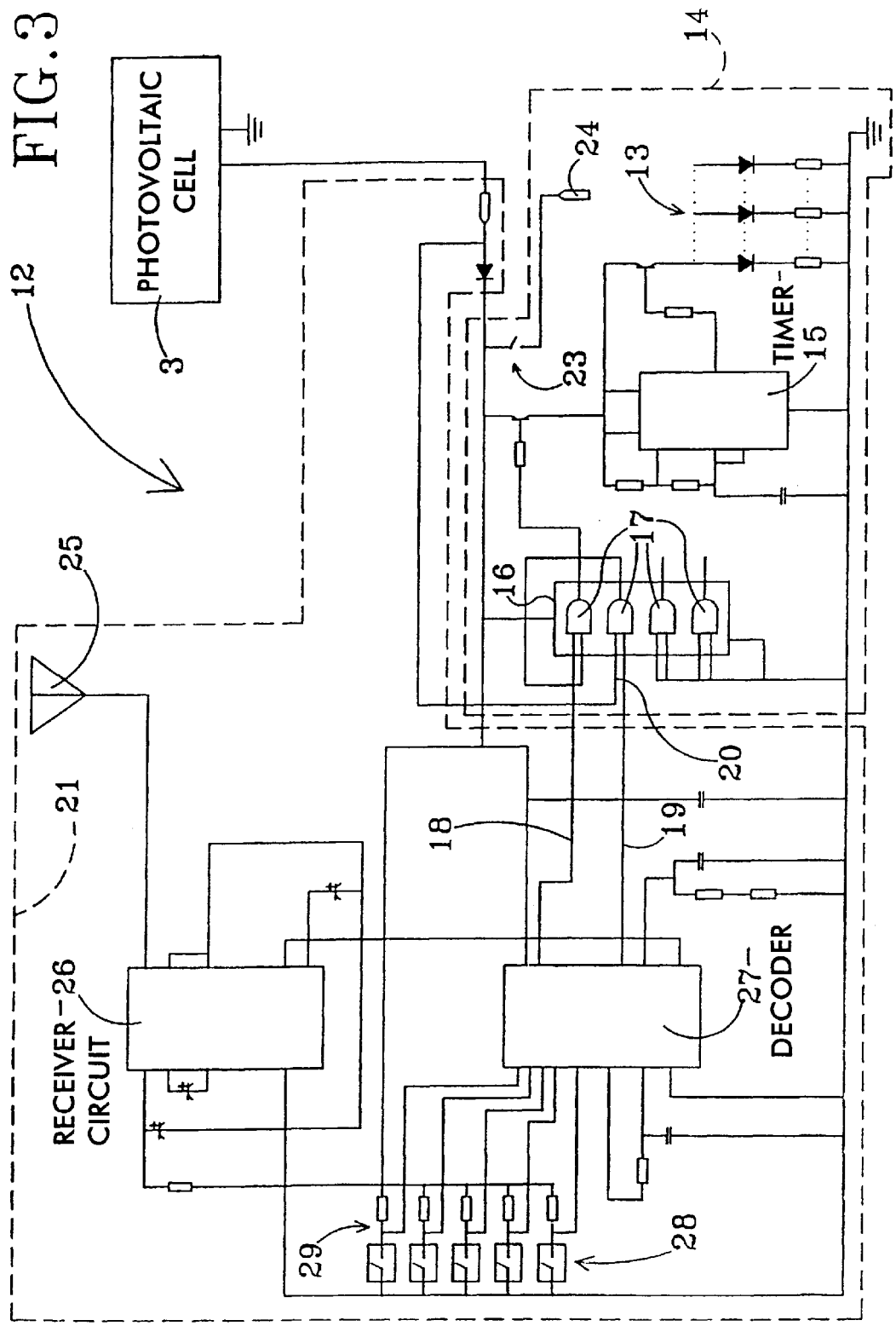
FIG. 3 shows the electronic circuit diagram for the control of the luminous indicators of the signalling beacon in FIG. 1, likewise of the receiver-decoder circuit of same.

As can be seen in FIG. 3, an electronic control circuit -14- with the luminous indicators -13- is made up of a timer CMOS 555 -15-, configured in a stable manner and working at a 1 Hz frequency, with a working cycle of 91.5%, which makes the light emitting diodes -13- light up periodically each second, which means when the timer exit -15- is at a low level, and the duration of the flash is approximately 80 ms. The control circuit -14- is also made up of a block -16- that carries out the logical function of polarising the timer -15- and the light emitting diodes -13-. The block -16- is based on a 74HC00, in which only two of the four NAND ports -17- are used. The input variables of said block -16- are the light up signal -18-, the twilight mode signal -19- and the signal that indicates the absence of ambient light -20-.

Signals -18- and -19- are obtained via a radio frequency from a transmitter-coder circuit -22-, whilst the signal -20- is directly the output tension of the photovoltaic cell -3- (this signal -20- is a high level, 1, when the cell -3- is under illumination, whilst it is at a low level, 0, when the cell -3- is in the absence of light). In the following table the state of the light emitting diodes (illuminated/off) can be seen which make up part of the luminous indicators -13-, in line with the values of the logical input variables of the block -16-:

| Signal -18- | Signal -19- | Signal -20- | Luminous Indicators |
|---|---|---|---|
| 0 | 0 | 0 | Off |
| 0 | 0 | 1 | Off |
| 0 | 1 | 0 | Off |
| 0 | 1 | 1 | Off |
| 1 | 0 | 0 | Illuminated |
| 1 | 0 | 1 | Illuminated |
| 1 | 1 | 0 | Illuminated |
| 1 | 1 | 1 | Off |

The electronic control circuit -14- is also made up of an ultra-miniaturised switch -23-, like a SPTD micro-switch activated by a lever. This switch -23- has the function of switching off the supply to the beacons -1- being stacked, on activating itself by means of a rod (not shown). Said rod, on one hand, is in contact with the switch -23-, whilst on the other hand it is free and is activated by the lid -2- of the beacon -1- onto which it is stacked.

The tension input -24- corresponds to the positive terminal of the battery -7-, whilst the rest of the components form part of the configuration of the timer -15- and are necessary for its correct working, as a result of which it is not necessary to carry out an analysis.

In FIG. 3 the receiver-decoder control circuit -21- can be seen, which is destined to receive and decode the signal transmitted by the electronic transmitter-encoder circuit -22-. Said circuit is made up of an aerial -25-, a receiver circuit -26-, a decoder -27-, numerous micro-switches -28-, and pull-up of resistors -29-.

The aerial -25- is based on a λ4 monopole and in making the choice its size, the range radio-control activation and the design simplicity must be taken into account.

The receiver -26- is an RX1005 of RFM, that is, an ASH receiver, which allows a wide interval of pulse modulation schemes. It has a very low consumption, it can be used without any type of licence, and great versatility in the encoding/decoding of the information.

The decoder -27- is a Motorola MC45027, and it is a CMOS low consumption integrated circuit, which is capable of interpreting the information supplied by the electronic transmitter-encoder circuit -22-. Said information is made up of a 9-bits raster, whose first five bits are address bits, which allows 243 different addresses of trinary encoding and 32 of binary encoding;

and whose four remaining bits are data bits, of which two are used: one for the signal -18- and the other for the signal -19-.

The micro-switches -28- are used to assign the address to the five stated bits (one micro-switch—one bit), whilst the pull-up of resistors -29- allows the choice of high level or low level for each one of the decoder address inputs -27-.

Figure 4:
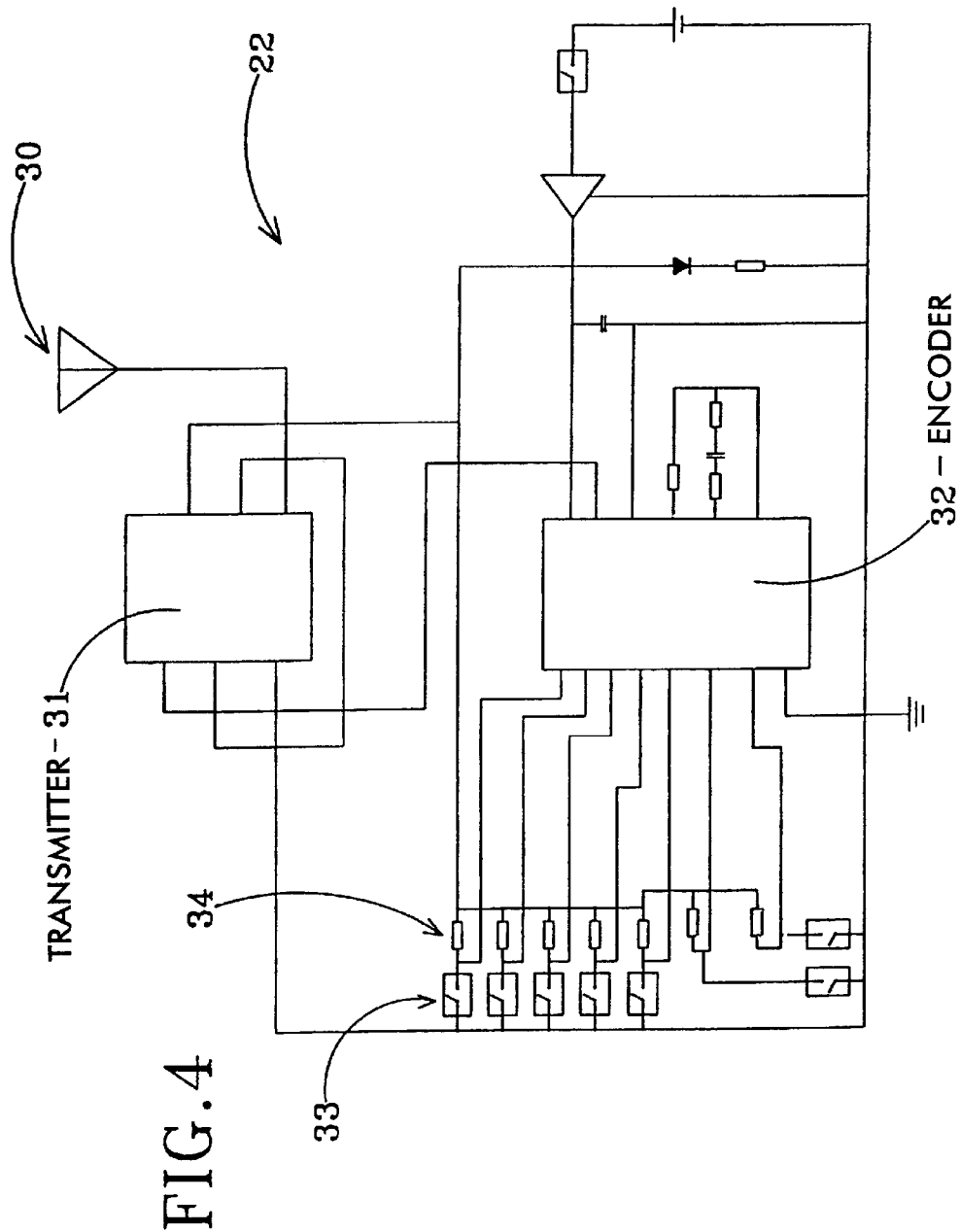
FIG. 4 shows electronic circuit diagram of the transmitter-encoder of the beacon in the invention.

In FIG. 4 the electronic transmitter-encoder circuit -22- is represented. Said circuit carries out the signal coding and the transmission by radio frequency to the beacon -1-. The circuit is made up of an aerial -30-, a miniaturised transmitter -31-, and an encoder -32-.

The aerial -30- is based on a □/4 monopole and in making the choice characteristics such as its size, the range of the radio-control activation and the design simplicity must be taken into account.

The miniaturised transmitter -31- used is adjusted to the 433.92 MHz transmission frequency and does not require a licence in Europe, as it is adapted to the present regulations for the frequency band that it uses. The transmitter generates an on-off-keyed (OOK) modulation, from the rasters that it receives from the aforementioned encoder -32-.

The encoder -32- generates the 9-bits rasters that the transmitter -31- uses for the modulation. The first 5 bits are those of address and coincide with the value assigned to the first 5 input pins of the encoder -32-, whilst the remaining 4 bits are data bits. Of these four bits only two are needed for the signals -18- and -19-. The rest of the components shown in the figure have been designed in order to obtain a 14 ms bit period, which will allow a transmission speed of 72 bps.

The address, formed by the first 5 bits of the rasters, are assigned by means of the assembly which makes up the micro-switches -33- and a pull-up of resistors -34-, which allows the choice of high level or low level for each one of the encoder -32- address inputs. Hence, with this binary encoding, a total of 32 different addresses can be discriminated.

The working of the beacon -1- of the invention is as follows.

Once having placed the beacons -1- at the desired locations, the lighting of same is proceeded with, provided that it is necessary. In order to do this the photovoltaic cell -3- must generate energy, which is stored in the battery -7-. In the electronic encoder-transmitter circuit -22-, the encoder -32- generates the 9-bits raster (the first five are address bits, which is determined by the micro-switches -33- and the pull-up of resistors -43-, the four remaining are the data bits), which are transmitted by means of the transmitter -31-, by radio frequency at a transmission frequency of 433.92 MHz, through an aerial -30-. This raster is received by the electronic receiver-decoder circuit -21- through an aerial -25-. This raster passes to the receiver -26- and subsequently to the decoder -27-, which carries out the interpretation of the information encoded in the raster, in the electronic transmitter-encoder circuit -22-. In order to do this it is necessary for the micro-switches -28- and the pull-up of resistors -29- represent the five address bits equal to the five address bits of the raster generated by the said transmitter-encoder circuit -22-.

Subsequently, the decoder generates the signals -18- and -19-, which pass to the electronic control circuit -14- of the beacon -1-. Said signals -18- and -19-, in addition to the signal -20- obtained directly from the output tension of the photovoltaic cell -3- and which represents the presence or absence of light, are received by the block -16-, which polarises the timer -15- and the light emitting diodes -13-, carrying out the switching on or off of the beacon -1-, in accordance with the signal received. In the event of the lighting up of the diodes -13- being produced, the beacon -1- is configured so that it lights up each second, for a flash duration of 80 ms.

In accordance with the preferred embodiment of the invention, the beacon -1- also has, on the inside of its support 8, a radar device 60 for the obtaining of the speed of the vehicles that are driving along the road, for the purpose of controlling said speed. In the event of this speed being greater than that permitted, the radar automatically takes a photograph of the vehicle in order to be able to demonstrate the fact to the offender.

In spite of the fact that reference has been made to a specific embodiment of the invention, it is clear for an expert in the subject that the signalling beacon is capable of numerous variations and modifications, and that all the details stated can be substituted for others that are technically equivalent, without departing from the scope of the protection defined in the attached claims.

What is claimed is:

1. Signalling beacon of comprising a luminous indicator assembled on a casing, the casing allowing the beacon to be stacked, an energy accumulation device, at least one photovoltaic cell, and an electronic device for the beacon, the electronic device has a receiver circuit for radio frequency of radio communication signals transmitted by a transmitter circuit, and a control circuit of the luminous indicator, the control circuit of the luminous indicator comprises a timer, a logical circuit for polarisation of the timer and of the luminous indicator, and a connection device for switching off a supply to the energy accumulation device in the event of stacking of the beacons.

2. Signalling Beacon, in accordance with claim 1, wherein the photovoltaic cell is made up of 16 cell elements connected together in series, forming a total surface area of at least 100 $cm^2$.

3. Signalling Beacon, in accordance with claim 2, wherein the total surface area of the photovoltaic cell is 120 $cm^2$.

4. Signalling Beacon, in accordance with claim 1, wherein the transmitter-encoder circuit a by radio frequency is made up of an aerial, a transmitter, an encoder, numerous micro switches, and a pull-up of resistors.

5. Signalling Beacon in accordance with claim 1, wherein the receiver-decoder circuit is made up of an aerial, a receiver, a decoder, numerous switches, and a pull-up of resistors.

6. Signalling Beacon, in accordance with claim 1, wherein the luminous indicator is made up of at least one high intensity light emitting diode.

7. Signalling Beacon, in accordance with claim 1, including a support having an inside in which an energy accumulation device is fitted.

8. Signalling Beacon, in accordance with claim 7, including a support having an inside in which a radar device is disposed.

9. Signalling Beacon, in accordance with claim 1, wherein the energy accumulation device is a lead battery.

10. Signalling Beacon in accordance with in accordance with claim 1, wherein the frequency range of the signals transmitted by the transmitter-encoder circuit is from 25 to 1,000 MHz.

11. Signalling Beacon in accordance with claim 1, wherein the transmitter-encoder circuit has a potential of less than 10 mW.

12. Signalling Beacon in accordance with claim 1, further comprising a rod having one end in contact with a connection device, while the other end remains free.

\* \* \* \* \*

UNITED STATES PATENT AND TRADEMARK OFFICE
CERTIFICATE OF CORRECTION

PATENT NO.    : 6,753,762 B1
DATED         : June 22, 2004
INVENTOR(S)   : Jose Jorba Gonzalez It is certified that error appears in the above-identified patent and that said Letters Patent is hereby corrected as shown below:

<u>Title page,</u>
Item [75], Inventor, should read -- Jose Jorba Gonzalez, Barcelona (ES).

Signed and Sealed this

Twenty-eighth Day of September, 2004

JON W. DUDAS
*Director of the United States Patent and Trademark Office*